(12) United States Patent
Thorne et al.

(10) Patent No.: US 12,460,801 B2
(45) Date of Patent: Nov. 4, 2025

(54) OPTICAL DEVICES AND MOUNTING FOR OPTICAL DEVICES

(71) Applicant: SimpliSafe, Inc., Boston, MA (US)

(72) Inventors: Scott Joseph Thorne, Allston, MA (US); Dirk Ahlgrim, Boston, MA (US); Rahul Subramany, Waltham, MA (US); Rebecca Petersen, Medford, MA (US); Darrell Andrew Holigan, Winchester, MA (US)

(73) Assignee: SimpliSafe, Inc., Boston, MA (US)

( * ) Notice: Subject to any disclaimer, the term of this patent is extended or adjusted under 35 U.S.C. 154(b) by 1 day.

(21) Appl. No.: 18/484,574

(22) Filed: Oct. 11, 2023

(65) Prior Publication Data

US 2024/0035646 A1     Feb. 1, 2024

Related U.S. Application Data

(62) Division of application No. 17/863,768, filed on Jul. 13, 2022, now Pat. No. 11,821,613, which is a
(Continued)

(51) Int. Cl.
    *F21V 21/096*     (2006.01)
    *F21L 4/04*     (2006.01)
(Continued)

(52) U.S. Cl.
    CPC ............ *F21V 21/0965* (2013.01); *F21L 4/04* (2013.01); *F21V 23/06* (2013.01); *G03B 17/561* (2013.01); *H04N 23/51* (2023.01)

(58) Field of Classification Search
    CPC .... G03B 17/56; G03B 17/561; G03B 17/563; G03B 17/565; G03B 17/566;
(Continued)

(56) References Cited

U.S. PATENT DOCUMENTS

| 4,901,096 | A | 2/1990 | Lemelson |
| 5,241,542 | A | 8/1993 | Natarajan et al. |

(Continued)

FOREIGN PATENT DOCUMENTS

| CA | 2157742 A1 | 3/1997 |
| CN | 1465109 A | 12/2003 |

(Continued)

OTHER PUBLICATIONS

"VueZone Motion Detection Personal Video Network Review", Gadgeteer Article at https://the-gadgeteer.com/2011/08/10/vuezone-motion-detection-personal-video-network-review/ dated Aug. 10, 2011 accessed Feb. 18, 2025 (Year: 2011).*

(Continued)

*Primary Examiner* — Leon W Rhodes, Jr.
(74) *Attorney, Agent, or Firm* — Wolf, Greenfield & Sacks, P.C.

(57) ABSTRACT

An optical device, such as a camera or spot light, having first and second removably engagable components. Disengagement of the components exposes a battery compartment in the second component. The first component can include all optical components of the optical device, such as a camera or light. A magnetic mount can provide a secure and adjustable mounting for the optical device housing on a support.

35 Claims, 8 Drawing Sheets

Related U.S. Application Data division of application No. 16/501,140, filed on May 18, 2020, now Pat. No. 11,421,864.

(51) Int. Cl.
*F21V 23/06* (2006.01)
*G03B 17/56* (2021.01)
*H04N 23/51* (2023.01)

(58) Field of Classification Search
CPC .......... G03B 13/1963; G03B 13/19632; F16M 13/02–027
See application file for complete search history.

(56) References Cited

U.S. PATENT DOCUMENTS

| | | |
|---|---|---|
| 5,323,302 A | 6/1994 | Bertling et al. |
| D349,714 S | 8/1994 | Hasegawa |
| 5,825,413 A | 10/1998 | Mullis |
| 5,959,622 A | 9/1999 | Greer et al. |
| D437,579 S | 2/2001 | Toops et al. |
| 6,265,845 B1 | 7/2001 | Bo et al. |
| D500,511 S | 1/2005 | Sybilrud |
| 7,429,432 B2 | 9/2008 | Kozu et al. |
| 7,471,334 B1 | 12/2008 | Stenger |
| 7,507,946 B2 | 3/2009 | Goldberg et al. |
| 7,609,952 B2 | 10/2009 | Jezierski et al. |
| D624,577 S | 9/2010 | Kujawski et al. |
| 7,873,266 B2 | 1/2011 | Schnell |
| 7,928,842 B2 | 4/2011 | Jezierski et al. |
| 8,085,342 B2 | 12/2011 | Agan et al. |
| D659,871 S | 5/2012 | Lee et al. |
| 8,675,066 B2 | 3/2014 | Trundle et al. |
| 9,153,111 B2 | 10/2015 | Trundle et al. |
| 9,282,297 B2 | 3/2016 | Siann et al. |
| 9,301,412 B2 * | 3/2016 | Micko .................. H01F 7/0252 |
| 9,426,339 B2 | 8/2016 | Pacurariu et al. |
| 9,611,881 B2 | 4/2017 | Khodapanah et al. |
| 9,611,978 B2 | 4/2017 | Manniche et al. |
| 9,614,204 B2 | 4/2017 | Tseng et al. |
| 9,746,170 B1 | 8/2017 | Armer et al. |
| D797,176 S | 9/2017 | Lin et al. |
| 9,760,119 B2 | 9/2017 | Hung et al. |
| 9,773,601 B2 | 9/2017 | Breiwa et al. |
| 9,780,417 B2 | 10/2017 | Mizrahi |
| D832,329 S | 10/2018 | Li |
| 10,326,965 B2 | 6/2019 | Siann et al. |
| 10,718,996 B2 | 7/2020 | Ramones et al. |
| 10,842,330 B2 | 11/2020 | Conrad |
| 11,171,449 B2 | 11/2021 | Hirose et al. |
| 11,258,928 B2 | 2/2022 | Hamada et al. |
| 11,421,864 B2 | 8/2022 | Thorne et al. |
| 2003/0180582 A1 | 9/2003 | Masumoto et al. |
| 2004/0212678 A1 | 10/2004 | Cooper et al. |
| 2005/0212912 A1 | 9/2005 | Huster |
| 2006/0171700 A1 | 8/2006 | Yang et al. |
| 2007/0001087 A1 | 1/2007 | Shyu et al. |
| 2007/0120970 A1 | 5/2007 | Goffin |
| 2007/0243457 A1 | 10/2007 | Viduya et al. |
| 2009/0169982 A1 | 7/2009 | Goto |
| 2009/0196597 A1* | 8/2009 | Messinger ............. F16M 11/14 348/143 |
| 2010/0117591 A1 | 5/2010 | Thomas et al. |
| 2011/0223447 A1 | 9/2011 | Ignor et al. |
| 2011/0308831 A1 | 12/2011 | Martinsson et al. |
| 2012/0033416 A1 | 2/2012 | Ballard |
| 2012/0176534 A1* | 7/2012 | Tsai ....................... H04N 23/57 348/374 |
| 2013/0302654 A1 | 11/2013 | Schaefer |
| 2015/0277491 A1 | 10/2015 | Browning et al. |
| 2015/0345699 A1 | 12/2015 | Manniche et al. |
| 2019/0191059 A1 | 6/2019 | Park |
| 2019/0282037 A1* | 9/2019 | Johnson .................. A47K 3/38 |
| 2021/0356104 A1 | 11/2021 | Thorne et al. |

FOREIGN PATENT DOCUMENTS

| | | |
|---|---|---|
| CN | 103270623 A | 8/2013 |
| CN | 109546027 A | 3/2019 |
| JP | 2013-175471 A | 9/2013 |

OTHER PUBLICATIONS

Invitation to Pay Additional Fees mailed Oct. 28, 2021 for International Application No. PCT/US2021/032470.

International Search Report and Written Opinion mailed Apr. 13, 2022 for International Application No. PCT/US2021/032470.

International Preliminary Report on Patentability mailed Dec. 1, 2022 for International Application No. PCT/US2021/032470.

[No Author Listed], Battery Pack 94ACC1302. 2019. https://www.amazon.com/Battery-94ACC1302-Replacement-Datalogic-944551020/dp/B0813GZSSJ. 4 pages.

[No Author Listed], Battery Compatible with Honeywell Dolphin 9900 Rechargeable Barcode Scanner 7.2v 2500mAH Li-Ion. https://www.amazon.com/Honeywell-Dolphin-Battery-Replacement-2500mAH/dp/B07XJ6J2VM. 5 pages.

* cited by examiner

OPTICAL DEVICES AND MOUNTING FOR OPTICAL DEVICES

RELATED APPLICATION

This application is a divisional of U.S. application Ser. No. 17/863,768, filed Jul. 13, 2022, which is a divisional of U.S. application Ser. No. 16/501,140 filed May 18, 2020, which is herein incorporated by reference in its entirety.

TECHNICAL FIELD

This application relates to optical devices, such as a camera, spot light or other device that can emit and/or detect light.

BACKGROUND

Optical devices, such as cameras and spot lights, are known for use in a variety of different applications, such as with security systems. Cameras and/or spot lights can be used to record image data from and/or illuminate areas of interest, such as near the front door of a house. Some such optical devices can be battery-powered, easing installation and increasing the range of locations that the optical devices can be deployed.

SUMMARY OF INVENTION

In some aspects, a battery for use in a wireless optical device (e.g., camera, light, flood light, doorbell) can include one or more battery cells arranged to provide electrical power, and a housing having an internal space in which the one or more battery cells are located. The housing can have an elongated outer wall with an oval cross-sectional shape and first and second end walls at opposed ends of the elongated outer wall. The elongated outer wall can have an upper portion that is flat and includes first and second grooves arranged to engage with corresponding first and second detents of the wireless camera, e.g., to hold the battery in a compartment of the wireless camera. The upper portion can also include a plurality of electrical contacts connected to the one or more battery cells and arranged to provide the electrical power to the wireless camera. As an example, the electrical contacts can be arranged to make electrical contact with corresponding electrical contacts in the camera battery compartment when the grooves are engaged with detents of the camera.

In some embodiments, the plurality of electrical contacts is positioned between the first and second grooves, and/or can each have a circular contact area. The plurality of electrical contacts can each be arranged along a line that extends along a longitudinal axis of the elongated outer wall, e.g., so the line extends through the first and second grooves, and the plurality of electrical contacts can be positioned nearer to the first groove than the second groove along the line. The first and second grooves can each have an elongated shape with forward and rear edges that extend along opposite sides of the line.

In some embodiments, a flexible tab can extend from the housing and be arranged to be grasped by a user and to support a weight of the battery. This can aid a user in inserting and/or removing the battery from a battery compartment of the camera. In some cases, the flexible tab can extend from a curved side portion of the elongated outer wall between the upper portion and a lower portion that is flat and opposed to the upper portion. As an example, the flexible tab can include a hinge portion positioned adjacent the housing and adapted to permit movement of the flexible tab to a position in which the flexible tab is in contact with the housing.

In some embodiments, the battery housing can include bosses extending outwardly from each of the first and second end walls. These bosses can aid in properly positioning the battery in a battery compartment and/or reduce friction when moving the battery in the compartment. In some cases, the bosses extend in a direction along a major axis of the oval cross-sectional shape and/or along a minor axis of the oval cross-sectional shape of the housing. In some embodiments, an electrical connector can be arranged at the first end wall to provide an electrical connection to the one or more battery cells.

In some embodiments, a camera, such as a wireless battery operated camera, can include the battery, and a camera housing can include a battery compartment arranged to receive and hold the battery. In some embodiments, the camera housing includes a first component that is removable from a second component to expose the battery compartment, e.g., the first component can be a cap that supports a camera lens and/or other imager components and can be removable from a housing canister that forms the second component. In some cases, the cap can be engagable with the second component by a cam/cam follower engagement or any other suitable complementary engagement features. In some embodiments, the cap includes a first set of electrical connections arranged to form an electrical connection with a second set of electrical connections on the second component when the cap is engaged with the second component. As an example, the cap can include an imager, and the electrical connection between the first and second sets of electrical connections can provide electrical power from the battery to the imager and/or provide control or data communications between the imager and the second component.

In some embodiments, the battery compartment of the camera includes a recess to receive the battery and the first and second detents arranged to engage with the first and second grooves, respectively, when the battery is received in the recess. The battery compartment can include electrical contacts arranged to engage with the plurality of electrical contacts on the battery housing when the first and second detents are engaged with the first and second grooves. A flexible tab on the battery housing can be arranged to be grasped by a user and to support a weight of the battery, and the flexible tab can be positioned on the housing to allow a user to grasp the flexible tab when the battery is in the battery compartment to remove the battery from the battery compartment.

In some aspects, a battery-powered optical device can include a mounting portion, e.g., to mount the optical device on a building wall or other support, and an optical portion, e.g., to perform optical functions such as detecting light to capture one or more images and/or emit light to illuminate an area near the optical device. In some embodiments, the mounting portion defines a battery compartment within a distal end of the mounting portion, and the battery compartment can be configured to receive and hold a battery to power the optical device. The mounting portion can include a mount structure at a proximal end opposite the distal end of the mounting portion that is configured to arrange the optical device on a support. For example, the mounting portion can be arranged to allow the mounting portion to be fastened to a building wall or other support using fasteners. The mounting portion can include a first engagement region at the distal end of the mounting portion. The optical portion can include an optical component arranged to emit and/or detect light, and a second engagement region at a distal end of the optical portion that is configured to engage the first engagement region of the mounting portion to removably couple the optical portion to the mounting portion for use. As an example, the first and second engagement regions can be arranged to couple the mounting portion and the optical portion together in response to rotation or other movement of the first engagement region relative to the second engagement region. In some embodiments, the first and second engagement regions each include threads, a quarter-turn engagement, a bayonet mount, a detent, and/or a cam feature that are complementary to each other and are adapted to reversibly engage the mounting portion and the optical portion together. In some cases, the first or second engagement portion includes a male end and the other of the first and second engagement portion comprises a female end arranged to receive the male end.

The removable engagement of the optical portion with the mounting portion can provide several benefits, such as allowing relatively easy and quick exchange of optical portions, e.g., to replace an inoperable optical portion or to change functions of the optical device. For example, an optical device may originally be installed to illuminate an area around a house, but may later be changed to have a video recording function by simply changing the optical portion, and leaving the mounting portion in place. The removable optical portion can also allow for exchange of a battery while allowing the mounting portion to remain in place. Thus, for example, if the optical device is oriented in a particular way to record video from a specific location, the optical portion may be removed, and the battery replaced without disturbing the position and orientation of the mounting portion.

In some embodiments, the optical component of the optical portion defines a transparent region and includes an imaging device configured capture an image using light passing through the transparent region. As an example, the transparent region can include at least one of an opening and an optical lens. In some embodiments, an audio device can be disposed within the optical portion, e.g., for recording audio data and/or providing audio output, and/or the optical portion can include an illumination device to emit light. In some cases, an electrical connection between the mounting portion and the optical portion can be provided. For example, the electrical connection between the mounting portion and the optical portion can provide electrical power from a battery within the battery compartment to the optical portion, provide control and/or data communications between the optical and mounting portions, etc. The electrical connection between the mounting portion and the optical portion can be established when the mounting portion and the optical portion are coupled together, e.g., the first and second engagement regions can be arranged to couple the mounting portion and the optical portion together and establish the electrical connection in response to rotation or other movement of the first engagement region relative to the second engagement region.

In some embodiments, a battery can be configured to be disposed in the battery compartment, and the mounting portion can include battery contacts to electrically couple the battery to circuitry within the mounting portion. In some cases, an electrical connector can be disposed along a proximal end of the mounting portion and be configured to permit electrical connection to the optical device and/or to the battery. The mounting portion and the optical portion can together define a central horizontal plane and the battery compartment, which can be defined as a recess in the distal end of the mounting portion, can be defined substantially along the central horizontal plane.

In some aspects, a battery-powered camera includes a camera housing having a first component that is removable from a second component to expose a battery compartment within the second component. The battery compartment can be arranged to receive and hold a battery to provide power for the camera. The first component can include a camera lens for an imager, and the second component can include a mount structure to position the camera housing on a support.

In some embodiments, the first component can be a cap that supports the camera lens for an imager. The cap can include a first set of electrical connections arranged to form an electrical connection with a second set of electrical connections on the second component when the cap is engaged with the second component. As an example, the first component can be engagable with the second component by a cam/cam follower engagement, and the first and second sets of electrical connections can be engaged to form electrical connections when the first and second components are engaged with each other.

In some embodiments, the battery compartment can define a recess to receive the battery and can include one or more detents to engage with the battery received in the recess. The battery compartment can include electrical contacts arranged to engage with corresponding electrical contacts on the battery, e.g., when one or more detents engage with the battery. In some embodiments, the battery includes a flexible tab arranged to be grasped by a user and to support a weight of the battery, and the flexible tab can be positioned to allow a user to grasp the flexible tab when the battery is in the battery compartment to remove the battery from the battery compartment.

In some embodiments, the mount structure can include a pedestal that is separable from the second component, and a magnet can provide a magnetic force to hold the pedestal and the second component in engagement with each other. As an example, the second component can include a concave depression arranged to receive a complementary convex portion of the pedestal, and this engagement can allow the second component to be moved relative to the pedestal while the two remain engaged together.

In one aspect, a camera can include a housing having a front face along which a viewing area is defined, with the viewing area arranged to define an optical axis and to operate with an imager to capture image data. The housing can have a rear wall portion with a concave depression arranged to receive a complementary convex portion of a pedestal arranged to position the housing relative to the pedestal by a magnetic force. The rear wall portion can be arranged along a plane that is arranged at an angle of 30 degrees to 60 degrees relative to the optical axis. Alternately, or in addition, the concave depression can have a median axis arranged at an angle to the optical axis of between 30 degrees and 60 degrees.

In some embodiments, a magnet is mounted in the housing to provide the magnetic force between the pedestal and rear wall portion. As an example, the magnet can be disposed along an inner surface of the housing proximate the concave depression. In some embodiments, the magnet inside the housing can have a disc shape with a face of the disc shape adjacent a portion of the concave depression. In some embodiments, the pedestal can have a frustoconically shaped base and the convex portion has a partial spherical shape. Correspondingly in these embodiments, the concave depression can have a partial spherical shape.

In some embodiments, the optical axis is substantially perpendicular to an image capturing plane of the imager. In some cases, a camera lens can be disposed proximate to the viewing area, e.g., for operating on light that is received by the imager. In some embodiments, the housing defines a central horizontal plane that is parallel to the optical axis, and the optical axis can be arranged above the central horizontal plane whereas the concave depression of the rear wall portion can be arranged below the central horizontal plane. As an example, a central region of the concave depression of the rear wall portion can be arranged approximately 10 mm to 30 mm below the central horizontal plane, and the optical axis can be arranged approximately 10-30 mm above the central horizontal plane.

In some embodiments, the rear wall portion can extend from a rear-most surface of the housing distally toward the front face. As an example, the rear-most surface of the housing can be a second rear wall portion that is perpendicular to the optical axis, and the first rear wall portion having the concave depression can extend at least 30% to 50% of a distance between the rear-most surface and the front face. In some cases, the front face can be flat and perpendicular to the optical axis, and the housing can include a cylindrically shaped portion extending between the front face and the rear wall portion. As an example, the housing can have a first component that includes the front face and a distal part of the cylindrically shaped portion, and a second component that includes a proximal part of the cylindrically shaped portion and the rear wall portion. The first and second components can be selectively engageable and disengageable with respect to each other.

In some aspects, a camera can include a housing having a front face along which a viewing area is defined, with the viewing area arranged to operate with an imager to capture image data. The housing can have a rear wall portion with a concave depression arranged to receive a complementary convex portion of a pedestal arranged to position the housing relative to the pedestal by a magnetic force, e.g., provided by a magnet in the housing. The concave depression can have a median axis, and the magnet can have a planar face adjacent an inner side of the concave depression and arranged at a non-perpendicular angle to the median axis.

Other advantages and novel features will become apparent from the following detailed description of various non-limiting embodiments when considered in conjunction with the accompanying figures and claims.

BRIEF DESCRIPTION OF THE DRAWINGS

Aspects of the systems and methods described herein are described with reference to the following drawings in which numerals reference like elements, and wherein.

DETAILED DESCRIPTION

Aspects of the systems and method described herein are described below by way of one or more illustrative embodiments. It should be understood that the illustrative embodiments described are not intended to limit the aspects, but rather to help show how one or more aspects can be implemented in a particular example. Also, aspects can be implemented alone and/or in combination with other aspects. For example, some aspects below relate to an optical device such as a camera that has two parts that are separable to expose a battery compartment, whereas other aspects relate to a particular battery configuration and other aspects relate to a magnetic mount for an optical device. These aspects and others can be employed together, individually and/or in any suitable sub combination with each other.

In some aspects, an optical device such as a camera or illumination device includes a mounting portion that defines a battery compartment at a distal end, and an optical portion that is engagable at the distal end of the mounting portion to cover or conceal the battery compartment. The mounting portion can include mount structure to arrange the optical device on a support, such as a wall of a building. The optical portion can include optical components, such as a camera and associated optics (such as lenses, filters, etc.), a LED or other light emitting device, infrared or other sensors, and so on, and can receive power from the battery when coupled to the mounting portion. For example, corresponding electrical contacts on the optical portion and the mounting portion can be coupled when the optical portion is engaged with the mounting portion, allowing for electrical power, data, control and other signals to be exchanged between the optical and mounting portions. The removable optical portion can provide several benefits, such as allowing relatively easy and quick exchange of optical portions, e.g., to replace an inoperable optical portion or to change functions of the optical device. For example, an optical device can originally be installed to illuminate an area around a house, but can later be changed to have a video recording function by simply changing the optical portion, and leaving the mounting portion in place. The removable optical portion can also allow for exchange of a battery while allowing the mounting portion to remain in place. Thus, for example, if the optical device is oriented in a particular way to record video from a specific location, the optical portion can be removed, and the battery replaced without disturbing the position and orientation of the mounting portion.

Figure 1:
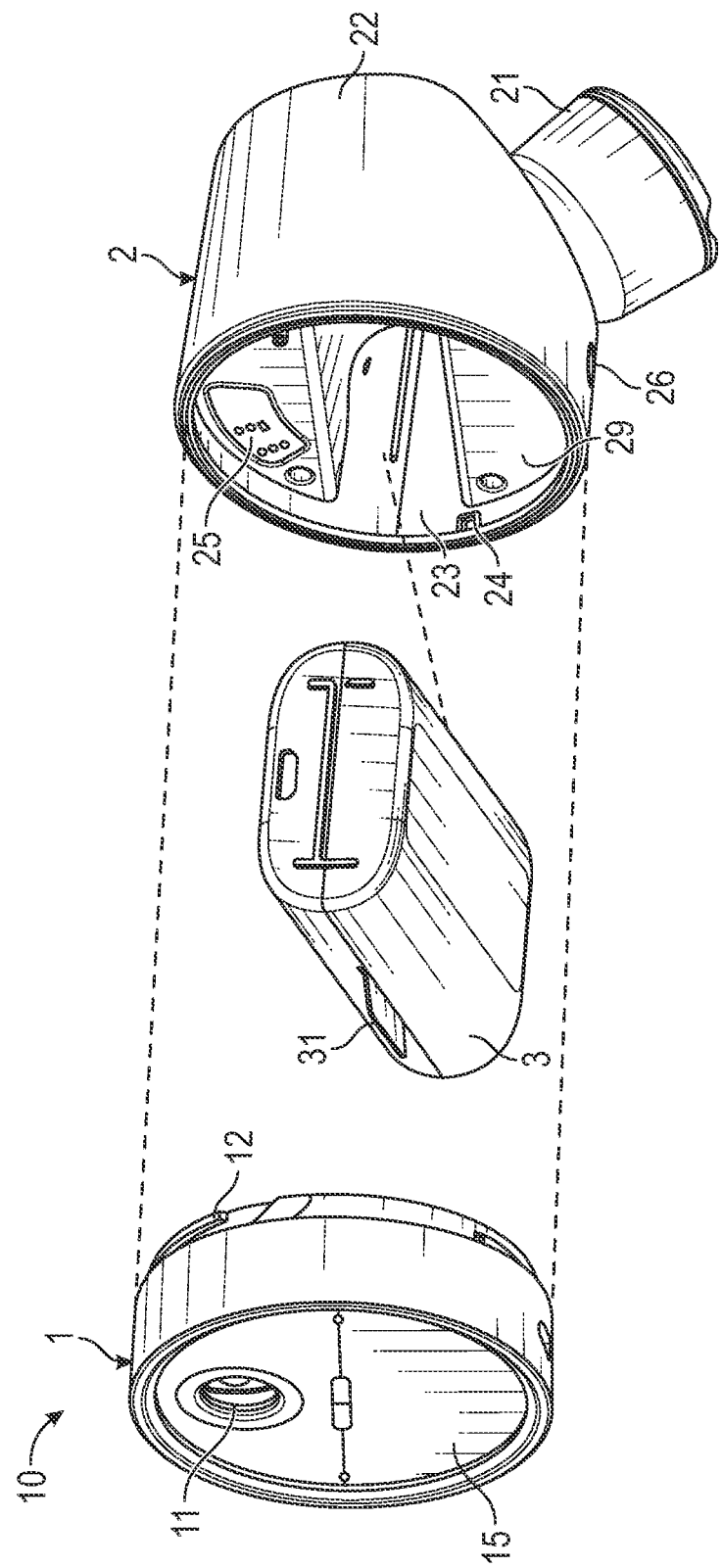
FIG. 1 is an exploded perspective view of a camera having a battery in an illustrative embodiment.

FIG. 1 shows an exploded view of an example optical device 10 (e.g., a camera, such as a battery-operated camera). In some embodiments the optical device 10 is arranged to function as a camera that can capture video and/or still image data, but could be arranged in other ways such as to additionally or alternately illuminate an area near the optical device 10. The optical device 10 includes a first component 1 that is removably engageable with a second component 2. The first component 1, which is arranged as a cap in some embodiments, can define an optical portion that includes an optical component 11 arranged to emit and/or detect light. The optical component 11 can include one or more elements for performing a desired optical function, such as a transparent region (e.g., an optical lens, opening, filter, light pipe or waveguide, etc.) through or via which light can be conducted, an imaging device (e.g., a CCD, CMOS, photosensor, or other light sensitive element for detecting light transmitted via the transparent portion), a LED or other light emitter, an audio component (e.g., a microphone to record audio to be combined with video data, a speaker, etc.), and so on.

The second component 2, which in some embodiments can be arranged to include a canister housing, can be arranged to support the optical device 10 and its components, e.g., the second component 2 can be a mounting portion with a mount structure to arrange the optical device 10 on a wall, post, or other structural support. As depicted, in some embodiments the second component 2 can include a mounting portion (e.g., a pedestal) 21 arranged at a proximal end that can be secured (e.g., in a fixed but movable manner) to the structural support and engage (e.g., couple, interface, attach) a housing portion 22 of the second component 2, e.g., in a way that allows the housing portion 22 (and the other components coupled to the housing portion 22) to be moved and held in a desired orientation relative to the pedestal 21. Thus, the pedestal 21 can be fixed to the support (such as by fasteners), and can engage the housing portion 22 so that the housing portion 22 can be adjusted in position relative to the pedestal 21, at least within a range of motion. In some cases such as those described more below, the pedestal 21 and housing portion 22 can engage via a magnetic force so that the housing portion 22 can be easily removed from, and/or moved relative to, the pedestal 21 without the use of tools. Of course, a pedestal 21 is not required and the housing portion 22 could be secured directly to a structural support in the same way as the pedestal 21, e.g., by glue, adhesive, magnetic force, fasteners, a clamp, etc.

The second component 2 (or mounting portion) typically defines a battery compartment (e.g., cavity, recess, opening) 23 as a recess within a distal end of the second component 2 that can receive and hold a battery 3 to power the optical device 10. As is discussed in more detail below, the battery 3 can be inserted into the battery compartment 23 so that electrical contacts on the battery 3 engage with corresponding contacts in the battery compartment 23 to allow the battery 3 to supply power to the optical device 10. Alternately, or in addition, electrical contacts on the battery 3 can contact corresponding contacts on the first portion 1, e.g., to provide power to the optical component 11. The battery 3 can include a tab or handle 31 that a user can grasp and use to manipulate the battery 3, e.g., for placement in and/or removal from the battery compartment 23.

The first component 1 (or optical portion) can include a first engagement region 12 at a distal end that is arranged to removably engage with a second engagement region 24 at a distal end of the second component 2 (or mounting portion). As an example, the first engagement region 12 is configured as a male end that is received into a female end of the second engagement region 24, although this arrangement can be reversed. The first and second engagement regions 12, 24 can be configured in any suitable way, such as having complementary threads, quarter-turn engagement features, a bayonet mount, interference fit surfaces, a detent, and/or cam features that are adapted to engage the first and second components 1, 2 together. Thus, in some cases the first and second components 1, 2 and/or the first and second engagement regions 12, 24 can be arranged to be coupled together in response to rotation of the first and second components 1, 2 relative to each other. The engagement can be reversible so the first component 1 can be removed from the second component 2, e.g., to allow replacement of the battery 3 and/or of the first component 1 in its entirety (e.g., to change the function of the optical device 10). Engagement of the first and second components 1, 2 can hold the battery 3 in place in the battery compartment 23, e.g., to help hold battery electrical contacts in proper position relative to complementary contacts in the compartment 23. For example, the first component 1 can contact the battery 3 when engaged with the second component 2, e.g., to make physical and/or electrical contact with the battery 3. The tab or handle 31 of the battery 3 can be movable, e.g., connected by a flexible hinge to the battery 3 housing, so the handle 31 can be moved into contact with the battery housing when the first and second components 1, 2 are engaged and the first component 1 contacts the battery 3. As shown in FIG. 1, the handle 31 can extend forwardly from the battery 3, and when the first component 1 is engaged with the second component 2, the first component 1 can contact the handle 31 and fold it up or down and into contact with the battery housing. Alternately, the first component 1 can simply cover the battery compartment 23 without contacting the battery 3.

Engagement or coupling of the first and second components 1, 2 can perform other functions as well, such as establishing an electrical connection between the first and second components 1, 2 or between the battery 3 and the first component 1. For example, FIG. 1 shows that the second component 2 includes a set of electrical contacts 25 at the distal end of the housing portion 22. These contacts 25 are arranged to make electrical contact with corresponding electrical contacts on the first component 1 (not shown in FIG. 1, see reference 13 in FIG. 3) when the first and second components 1, 2 are engaged with each other. This connection can provide an electrical connection between circuitry in the first and second components 1, 2, such as between the battery 3 and the optical component 11, between the optical component 11 and one or more portions of the second component 2 (such as an exposed connector 26 near a proximal end of the second component 2, e.g., so a wired connection can be established between the imager or other part of the optical component 11 and an external device), and so on. In some cases the sets of electrical contacts 13, 25 can require specific rotational positioning of the first and second components 1, 2 to ensure that the complementary contacts are engaged with each other. In this case, the first and second engagement regions 12, 24 can be configured to stop relative rotation of the first and second components 1, 2 (where rotational engagement is employed) at a closed position where the contacts 13, 25 are suitably aligned and engaged. Such a stop can also help properly align the first and second components 1, 2, e.g., so that a transparent region (lens or opening at the face of the first component 1 where light enters/exits) is properly positioned relative to the housing portion 22. Coupling of the first and second components 1, 2 can provide a water and/or air tight connection in some cases, e.g., to help prevent corrosion or disruption of electrical connections. As an example, one or both of the first and second engagement regions 12, 24 can include a gasket or seal, such as an o-ring, to provide a desired resistance to the passage of water or other fluid when the regions 12, 24 are engaged.

Figure 2:
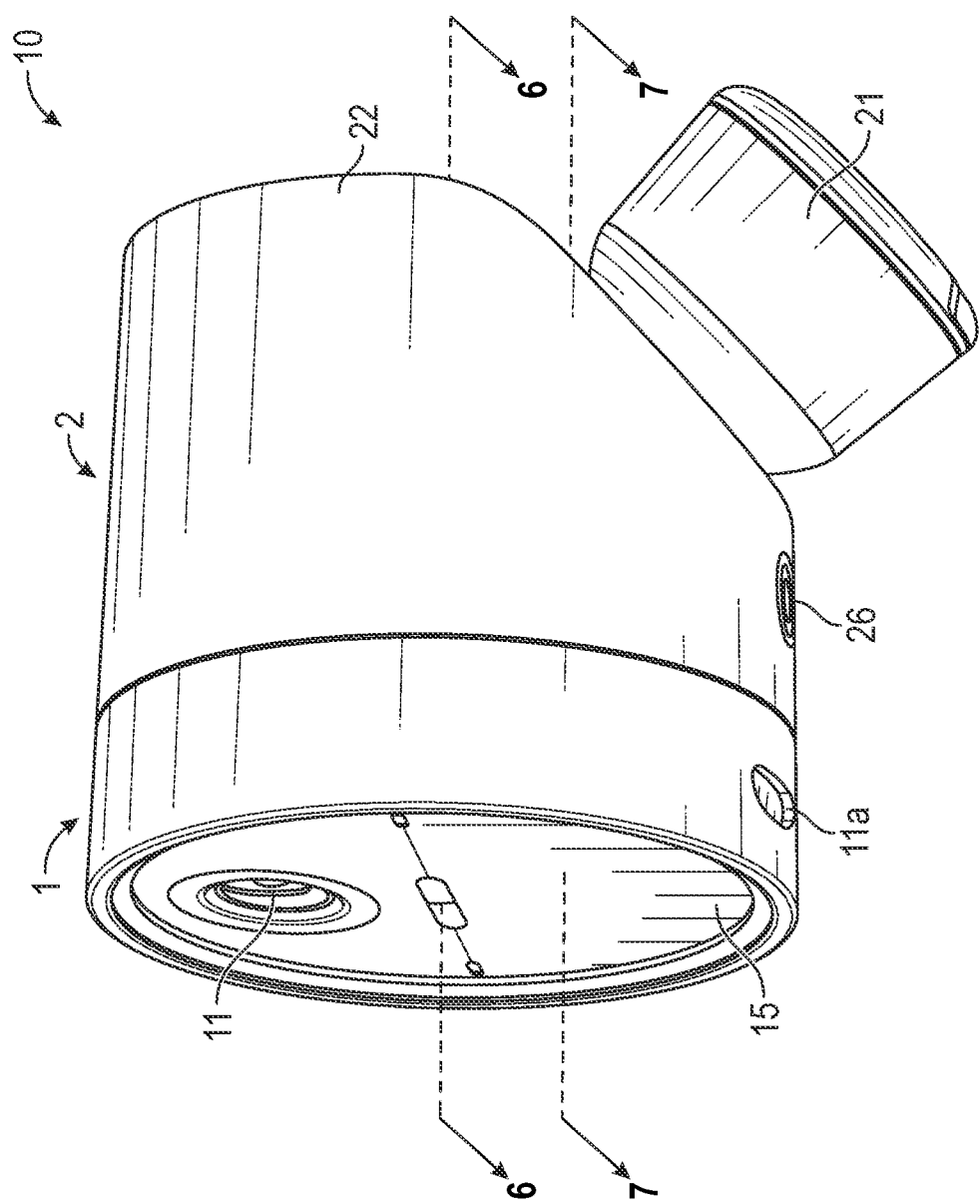
FIG. 2 is a perspective view of the FIG. 1 camera in assembled form.

FIG. 2 shows an example optical device 10 in an assembled condition, i.e., with the first and second components 1, 2 engaged or coupled together. In this condition, a front face 15 is oriented to face away from the housing portion 22, e.g., so that light emitted by the optical component 11 is transmitted away from the optical device 10, and/or so light received from an area generally in the direction in which the front face 15 is oriented can be detected by the optical component 11. Note that the optical component 11 can have multiple different parts which can perform different functions and not all components need be positioned at the front face 15. As an example, an infrared detector can be arranged at or near the front face 15 to detect infrared light (e.g., to detect the presence of a person and trigger the capture of video or other image data), whereas an audio speaker and/or microphone can generate/record sound at a location 11*a* away from the face 15, etc.

Figure 3:
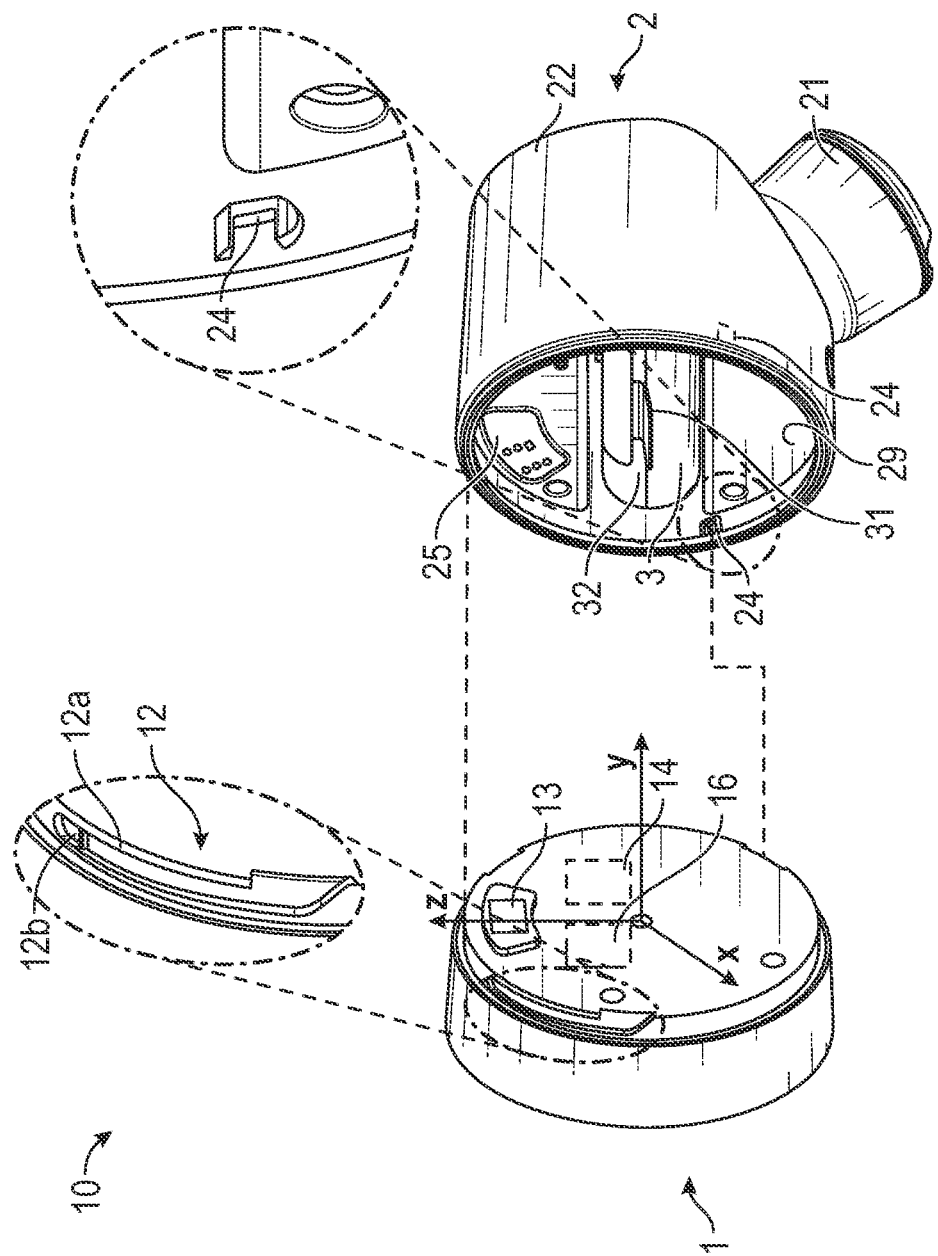
FIG. 3 is a perspective view of the FIG. 1 camera with a cap removed and exposing a battery compartment in a housing portion of the camera.

FIG. 3 shows the optical device 10 with the first component (e.g., a cap) 1 removed from the second component (e.g., a mounting portion) 2. The battery 3 is positioned in the battery compartment 23, and an upper part of the battery housing is removed solely for illustrative purposes to show one or more battery cells 32 that are contained in the battery housing. In some embodiments, as depicted, the first and second engagement regions 12, 24 include multiple (e.g., three) sets of complementary cam/cam follower or quarter-turn engagement features. In some cases, the engagement features can be distributed or positioned substantially evenly about a central axis of the optical device. The first engagement region 12 includes multiple (three in the depicted example) cam grooves 12*a* spaced around the distal end of the first component 1 and formed into an outer circumferential surface of the distal end, as can be seen in the close up view bubble, and the second engagement region 24 includes a typically corresponding number of (e.g., three) cam followers 24. Each cam groove can include a lead-in, tapered, or entrance area to receive a complementary cam follower 24 on the second engagement region 24 (see the close up view bubble for the cam follower 24). Each cam groove 12*a* typically extends circumferentially along the distal end of the first component 1 up to a termination. At the termination, a complementary feature (e.g., detent) 12*b* is arranged to provide feedback to the user during rotation of the first and second components 1, 2 during engagement, e.g., to provide a snap and lock of the first and second components 1, 2 when the cam follower 24 passes the detent 12*b* and the closed position is reached. This arrangement can also confirm to the user that the first and second components 1, 2 are properly positioned to make a suitable electrical connection between the contacts 13, 25.

As discussed above, proper electrical connection between the first and second component 1, 2 can allow for an electrical power connection between parts of the optical component 11, such as an imager 14 and/or controller 16, and the battery 3, connector 26 and/or other parts of the second component 2. As depicted, in some embodiments, the cam followers 24 each have a U-shaped element extending radially inwardly from the inner wall of the housing portion 22, but could be arranged in other ways, e.g., as a pin, boss, tab or other feature formed on the inner or outer wall of the housing portion 22 and arranged to engage with a complementary cam groove 12*a*. Similarly, in some cases, the cam groove(s) 12*a* can be located on an inner wall of the first component 1, e.g., on the inner surface of a sleeve element that fits over a distal end of the housing portion 22 that bears one or more radially protruding cam followers 24.

While certain embodiments have been illustrated, these are for illustrative purposes. As such, in some embodiments the cam/cam follower position can be reversed, with the cam follower on the first component 1 and the cam on the second component 2. Further, while some of the embodiments have been described as including a cam/cam follower or quarter-turn engagement, other arrangements for the engagement regions 12, 24 are possible, including complementary threads, bayonet connections, spring tab/groove, hook and loop, ball or other detent arrangements, collet or clamp arrangements, and other engagement features are possible. Some engagement arrangements can require relative rotation of the first and second components 1, 2 for engagement/disengagement, whereas others need not require rotation, but instead linear movement, sliding movement, etc.

Figure 4:
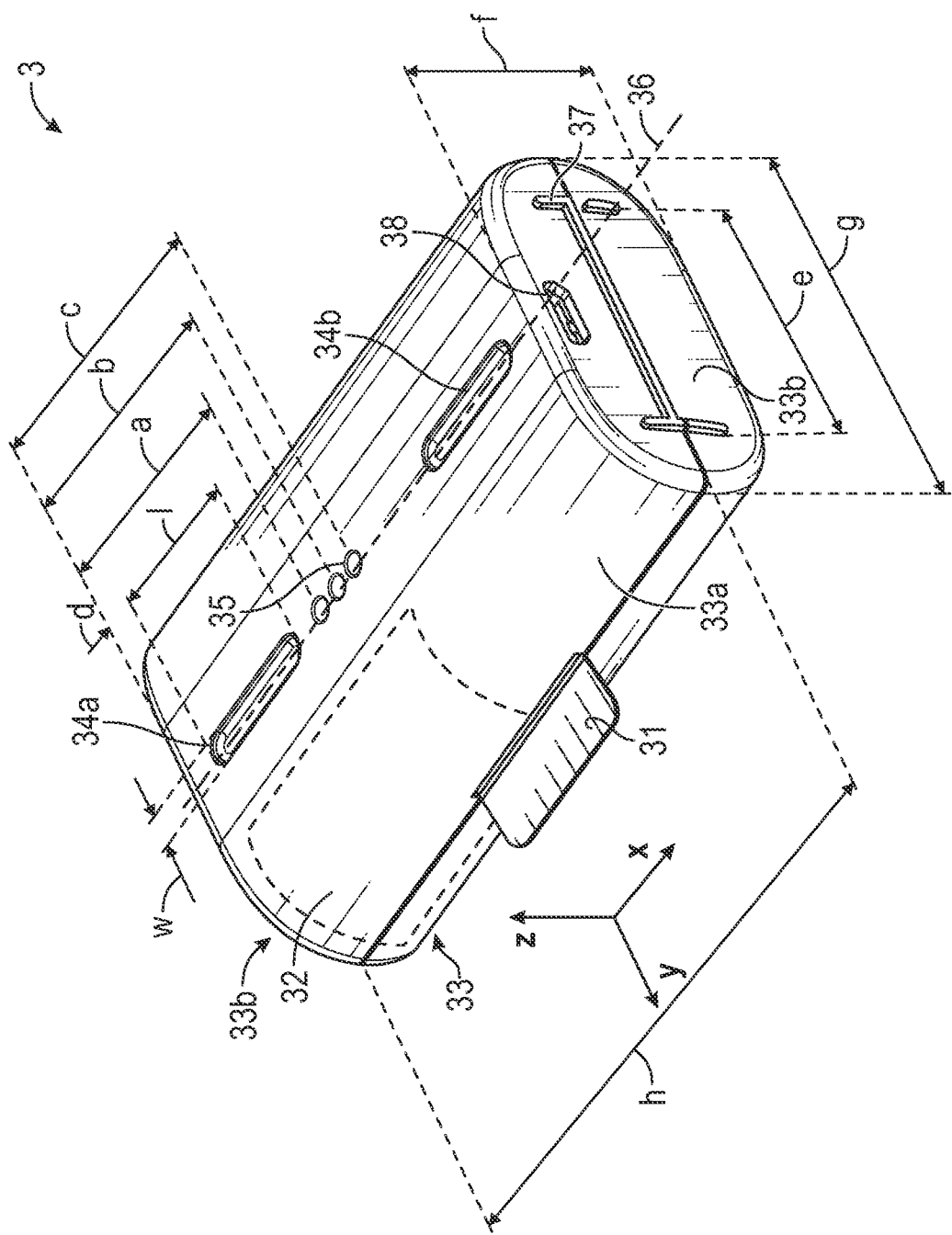
FIG. 4 is a perspective view of a battery usable with the FIG. 1 camera.
Figure 5:
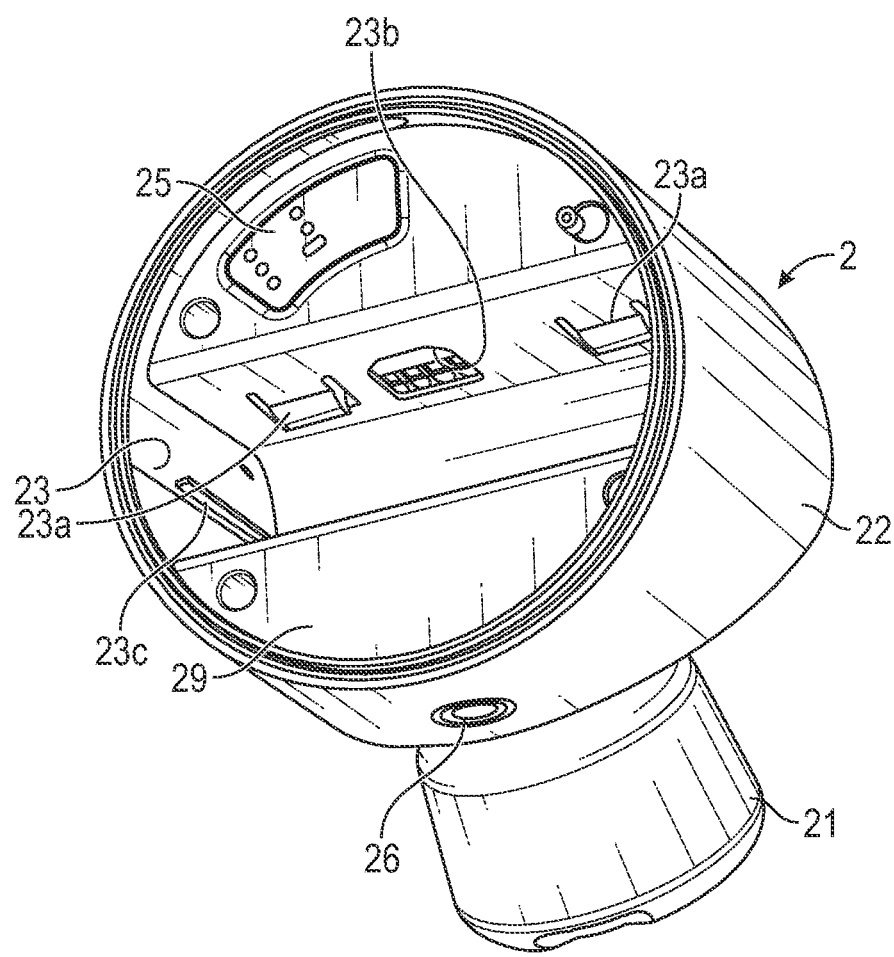
FIG. 5 is a perspective view of the FIG. 1 camera housing with the cap and battery removed to illustrate the battery compartment interior.

FIG. 4 shows a perspective view of the example battery 3. While some of the embodiments described herein show the battery 3 used in systems depicted in other figures, it should be understood that other battery arrangements can be employed, and a battery like that in FIG. 4 can be used in other applications. The battery 3 has a battery housing 33 with an internal space in which one or more battery cells 32 are arranged. The battery cells 32 can be arranged in any suitable way, such as cylindrical elements arranged electrically in parallel and/or series along with other suitable electronic components, e.g., for controlling power output and/or charging voltages, current, etc. The battery housing 33 has an elongated outer wall 33*a* with an oval cross-sectional shape and first and second end walls 33*b* at opposed ends of the elongated outer wall 33*a*. The elongated outer wall 33*a* has a length h of about 60 mm to 80 mm (e.g. about 65 mm to 75 mm (e.g., about 70 mm)), and the end walls 33*b* have a height f along a minor axis of the oval shape about 15 mm to 30 mm (e.g. about 20 mm to 25 mm (e.g., about 21 mm)), and a width g along a major axis of the oval shape of about 30 mm to 50 mm (e.g. about 35 mm to 45 mm (e.g., about 40 mm)). Accordingly, in some embodiments the battery housing 33 can have a length to height ratio of about 2:1 to 5.3:1 (e.g. about 3:1 to 4:1 (e.g., about 3.3:1)), a length to width ratio of about 1.2:1 to 2.6:1 (e.g. about 1.5:1 to 2:1 (e.g., about 1.75:1)), and a width to height ratio of about 1:1 to 3.3:1 (e.g. about 1.6:1 to 2.2:1 (e.g., about 1.9:1)). The elongated outer wall 33*a* typically has an upper portion that is flat and includes first and second grooves 34 arranged to engage with corresponding first and second detents in the battery compartment 23 of the optical device 10. The upper portion of the elongated outer wall 33*a* also includes a plurality of electrical contacts 35 (in this case three contacts) connected to the one or more battery cells 32 and arranged to provide electrical power to the optical device 10. FIG. 5 shows a perspective view of the battery compartment 23 and illustrates the first and second detents 23*a* that are arranged to engage with the first and second grooves 34 of the battery 3, and a set of electrical contacts 23*b* arranged to engage with corresponding ones of the electrical contacts 35 on the battery 3. The detents 23*a* and the grooves 34 are arranged so that when the detents 23*a* are engaged with the grooves 34, the contacts 23*b* and 35 are suitably aligned and form an electrical connection, e.g. so that the battery 3 can provide electrical power to the optical device 10 and/or can receive electrical power from the optical device 10, e.g., to charge the battery 3. Charging power can be provided to the battery 3 via the exposed connector 26 or other suitable connector on the first or second components 1, 2 of the optical device 10. The detents 23*a* can be each configured to have tab that extends downwardly into the battery compartment 23. Each tab is spring- or otherwise resiliently-biased to move downwardly so that once the tab of a detent 23*a* is received into a corresponding groove 34, the tab remains in resilient contact with the groove 34 and thus helps keep the battery 3 in position within the battery compartment 23. The resilient biasing force can be provided by a living hinge (e.g., the tab can extend downwardly from the distal end of a cantilever element), a spring, a foam rubber or other element.

In some embodiments, the electrical contacts 35 of the battery 3 are positioned between the first and second grooves 34 and each have a circular contact area, although differently shaped and/or positioned contact areas can be used. In some embodiments, the contacts 35 can be positioned closer to one of the grooves (a first groove 34a) on the left in FIG. 4 than another groove (a second groove 34b) on the right in FIG. 4. The contacts 35 can be positioned about 1 to 5 mm apart (e.g., 3 mm center to center), and can be positioned at about the dimensions a, b and c in FIG. 4 as follows: a: 24 to 30 mm (e.g. about 26 mm to 28 mm (e.g., about 27 mm)), b: 27 to 33 mm (e.g. about 28 mm to 32 mm (e.g., about 30 mm)), c: 30 to 36 mm (e.g. about 32 mm to 34 mm (e.g., about 33 mm)). The grooves 34 can have a width w of 2 to 6 mm (e.g. about 3 mm to 5 mm (e.g., about 4 mm)), a length l of 10 to 16 mm (e.g. about 12 mm to 14 mm (e.g., about 13 mm)), and be located at a distance d of about 5 to 7 mm (e.g. about 5.5 mm to 6.5 mm (e.g., about 6 mm)) from a nearest respective end wall 33b. The electrical contacts 35 can be each arranged along a common axis 36 that extends along a longitudinal axis of the elongated outer wall 33a. The common axis 36 can be generally parallel to a longitudinal axis of the battery 3 and generally centrally located with respect to a horizontal axis of the battery 3. The electrical contacts 35 can be positioned between the first and second grooves 34 such that the common axis 36 extends through the contacts 35 and the first and second grooves 34. For example, the contacts 35 can be substantially centrally located along the longitudinal length of the battery 3. In some cases, the contacts 35 can be centrally located between the grooves. The grooves 34 can have portions that extend along either side of the common axis 36, e.g., the elongated shape of the grooves 34 can have forward and rear edges that extend along opposite sides of the common axis 36. In some embodiments, the tab or handle 31 can be disposed along (or extend from) a forward side of the battery 3.

As discussed above, the tab 31 can be flexible, extend from the housing 33 and be arranged to be grasped by a user and to support a weight of the battery 3. In this case, the tab 31 extends from a curved side portion of the elongated outer wall 33a between the upper portion and the lower portion of the outer wall 33a, which is flat like the upper portion and opposed to the upper portion. The tab 31 can include a hinge portion positioned adjacent the housing 33 and be adapted to permit movement of the tab 31 to a position in which the tab 31 is in contact with the housing 33. For example, when the battery 3 is in the compartment 23 and the first component 1 is engaged with the second component 2, the first component 1 can contact the tab 31 and urge the tab 31 into contact with the housing 33, e.g., by folding the tab 31 up or down about a hinge region adjacent the housing 33. This can allow the battery 3 to have a readily available handle to grasp and remove the battery 3 from the compartment 23, e.g., by pulling to overcome the retaining force of the detents 23a, and without having the handle 31 interfere with engagement of the first and second components 1, 2. In some embodiments, the first component 1 can present a substantially flat face to the battery compartment 23, e.g., no part of the battery compartment 23 is formed as part of the first component 1. In other embodiments, a portion of the battery compartment 23 can be formed as part of the first component 1, e.g., a recess can be formed into the first component 1 that receives a part of the battery 3 when the first and second components 2 are engaged.

As noted above, proper positioning of the battery 3 in the battery compartment 23 can be important to ensure proper contact between the contacts 35 and the contacts 23b in the battery compartment 23. The battery 3 and/or the battery compartment 23 can include features to help ensure this proper positioning, whether in addition to the detents 23a and grooves 34, or as an alternative to them. For example, in some embodiments, the battery housing 33 includes bosses 37 that extend outwardly from each of the first and second end walls 33b. The bosses 37 can be arranged in other ways than that shown, and can be located in other places such as on the outer wall 33a, but in some embodiments the bosses 37 extend in a direction along a major axis of the oval cross-sectional shape of the outer wall 33a and along a minor axis of the oval cross-sectional shape of the outer wall 33a. For example, the bosses 37 extend in this case along the major axis a distance e of about 25 to 35 mm (e.g. about 27 mm to 33 mm (e.g., about 30 mm)), where the battery housing 33 has a major axis dimension g of about 30 mm to 50 mm (e.g. about 35 mm to 45 mm (e.g., about 40 mm)). The bosses 37 can extend along the minor axis a distance of about 7 to 9 mm (e.g. about 7.5 mm to 8.5 mm (e.g., about 8 mm)), where the housing 33 has a minor axis dimension f of 15 mm to 30 mm (e.g. about 20 mm to 25 mm (e.g., about 21 mm)). The bosses 37 can help properly position the battery 3 in the battery compartment 23 by contacting sidewalls of the compartment 23. In addition, the bosses 37 can make insertion and removal of the battery 3 from the compartment 23 easier by reducing friction. Reducing friction may be useful, particularly where the battery compartment 23 extends inwardly into the housing portion 22 by a distance equal to the width g of the battery housing 3.

The battery compartment 23 can have battery positioning features as well, such as one or more rails 23c (see FIG. 5) that extend rearward from the entrance to the compartment 23 toward a rear wall of the compartment 23. The rails 23c can contact the bosses 37 or other portions of the end walls 33b to help guide and position the battery 3 in the compartment. FIG. 4 also shows an electrical connector 38 at a first end wall 33b, e.g., to provide an electrical connection to the one or more battery cells. This can provide an alternative connector for charging the cells 32 and/or receiving power from the cells 32 than using the contacts 35. This can allow the battery 3 to be employed in a wider variety of applications because a connector arrangement that is compatible with the electrical contacts 35 configuration on the upper portion of the outer wall 33a need not be required.

In some aspects, the optical device can be mounted on a support, such as a wall or post, by a pedestal or other component that is engaged to the optical device housing by a magnetic force. The magnetic force mounting can provide a variety of useful features including providing a secure, reliable mounting that maintains the optical device's orientation in in the case of strong wind or physical contact, while also allowing a user to relatively easily remove the optical device housing from the pedestal without tools, e.g., for battery replacement. The magnetic force mounting can also allow a portion of the optical device housing to be kept in place while another portion, e.g., a cap housing optical components, is removed from the optical device housing. As a result, the optical device housing's orientation relative to the pedestal and support can be maintained while the cap or other part is removed, e.g., to allow for battery replacement. With the battery replaced, the cap can be re-engaged with the optical device housing without moving or otherwise changing the orientation of the housing. This can allow a user to replace a battery or take other action without affecting the orientation of the optical device. As an example, if the optical device includes a camera that is oriented to image a particular area around a house, a user can replace a battery, and attach a different optical component without having to reorient the optical device.

In some embodiments, an optical device can include an imager arranged to capture image data along an optical axis, and a rear wall portion of the optical device housing where a magnetic attachment is arranged can be arranged at an angle to the optical axis. For example, a CMOS or other imaging device can be arranged to receive light from an optical lens or other optical component or otherwise capture image data along an optical axis. So, while the imaging system can have a relatively wide or narrow field of view, the imaging system can generally capture image data in a direction of the optical axis. In some cases the optical axis can be arranged in a direction parallel to a longitudinal axis of the optical device housing. For example, the optical device housing can have a cylindrical shape that extends along a longitudinal axis, and the optical axis can be parallel to the longitudinal axis. (The optical device housing can have other cross sectional shape, such as square, rectangular, triangular, irregular, oval, oblong, etc.) This orientation can aid a user in properly aligning the optical device in a suitable direction to image and/or illuminate a particular area near the optical device since the user can generally point the longitudinal axis of the housing in the desired direction to properly orient the optical axis. For mounting the optical device on a support, the housing can have a rear wall portion with a concave depression arranged to receive a complementary convex portion of a pedestal that is secured to the support (such as a wall or post). The housing can be secured to the pedestal by a magnetic force, e.g., by a magnet located in the housing interior that exerts an attractive force on the pedestal. In some embodiments, the rear wall portion can be arranged along a plane that is arranged at an angle of 30 degrees to 60 degrees relative to the optical axis. Thus, the concave depression can be formed into the rear wall portion and arranged at a 30 to 60 degree angle (e.g. about 40 to 50 degrees (e.g., about 45 degrees)) to the optical axis. This configuration can provide an improved ability to secure the optical device to a support surface that is oriented at an angle between vertical and horizontal, e.g., as is often the case when mounting to clapboard siding, roof rake boards or soffits.

Figure 6:
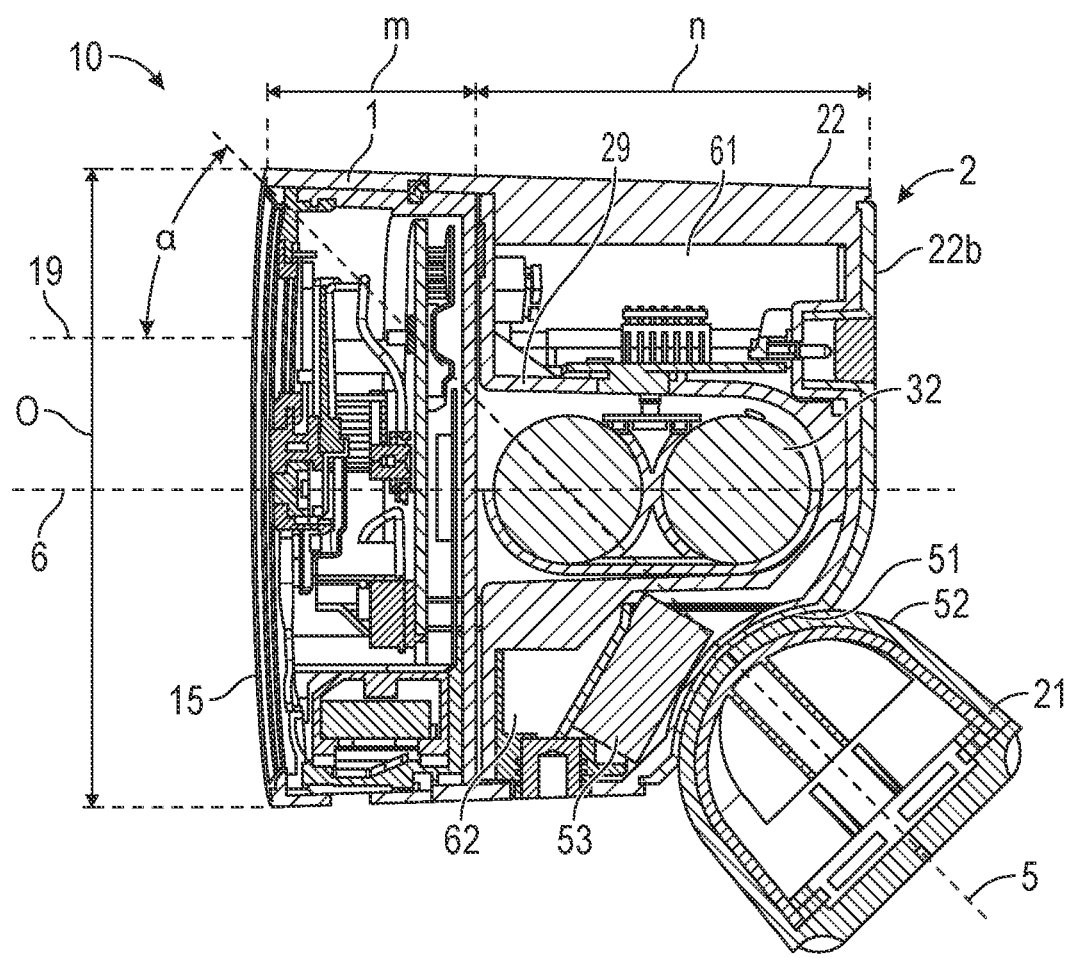
FIG. 6 is a section view of the FIG. 1 camera along the lines 6-6 in FIG. 2.

FIG. 6 shows a cross sectional view of the optical device 10 along the line 6-6 in FIG. 2 and illustrates an optical axis 19 along which the optical component 11 images and/or illuminates an area near the optical device 10. As an example, the optical axis 19 can be perpendicular to an image capturing plane of an imager 14. In some embodiments, the housing portion 22 defines a central horizontal plane 6, e.g., that passes through or includes a longitudinal axis of the cylindrical shape of the housing portion 22. The central horizontal plane 6 can pass through or near a center of mass of the optical device 10, and in this case passes through the battery 3 and battery compartment 23, which extends along the central horizontal plane 6. The optical axis 19 is typically substantially parallel to and above the central horizontal plane 6. In contrast, a concave depression 51 of the rear wall portion 22a that receives a complementary convex portion 52 of the pedestal 21 is arranged below the central horizontal plane 6. The concave depression 51 and convex portion 52 can have a partial spherical shape or other complementary shape that allows for suitable mating and relative movement between the depression 51 and convex portion 52. In some cases, the optical axis 19 can be a distance above the central horizontal plane 6 and that is approximately within +/−20% (e.g., +/−10% or +/−5%) of a distance that the concave depression 51 is below the central horizontal plane 6. Positioning the optical axis 19 and the concave depression 51 on opposite sides of the central horizontal plane 6 can allow for easier and more accurate positioning of the optical device 10, e.g., because smaller relative movement between the concave depression 51 and the convex portion 52 can cause a correspondingly larger angular adjustment of the optical axis 19 than if the concave depression 51 and optical axis 19 were positioned closer together.

In some embodiments, a central region of the concave depression 51 (an area near where a median axis 5 of the concave depression 51 intersects the concave depression 51) is arranged approximately 10 mm to 30 mm (e.g. about 15 mm to 25 mm (e.g., about 20 mm)) below the central horizontal plane 6, whereas the optical axis 19 is arranged approximately 10 mm to 30 mm (e.g. about 15 mm to 25 mm (e.g., about 20 mm)) above the central horizontal plane 6. In these embodiments, the housing portion 22 may have a diameter o of about 60 mm to 80 mm (e.g. about 65 mm to 75 mm (e.g., about 70 mm)) and so the central region of the concave depression 51 and the optical axis 19 can be positioned a distance from the central horizontal plane 6 that is about 25% to 80% (e.g. about 45% to 65% (e.g., about 58%)) or more of the distance between the central horizontal plane 6 and the outer surface of the housing portion 22. In some cases, the imager 14 can be positioned on the optical axis 19, and thus can be positioned at similar distances from the central horizontal plane 6. In some cases, the median axis 5 may intersect the optical axis 19 at a location that is at or near the imager 14.

Figure 7:
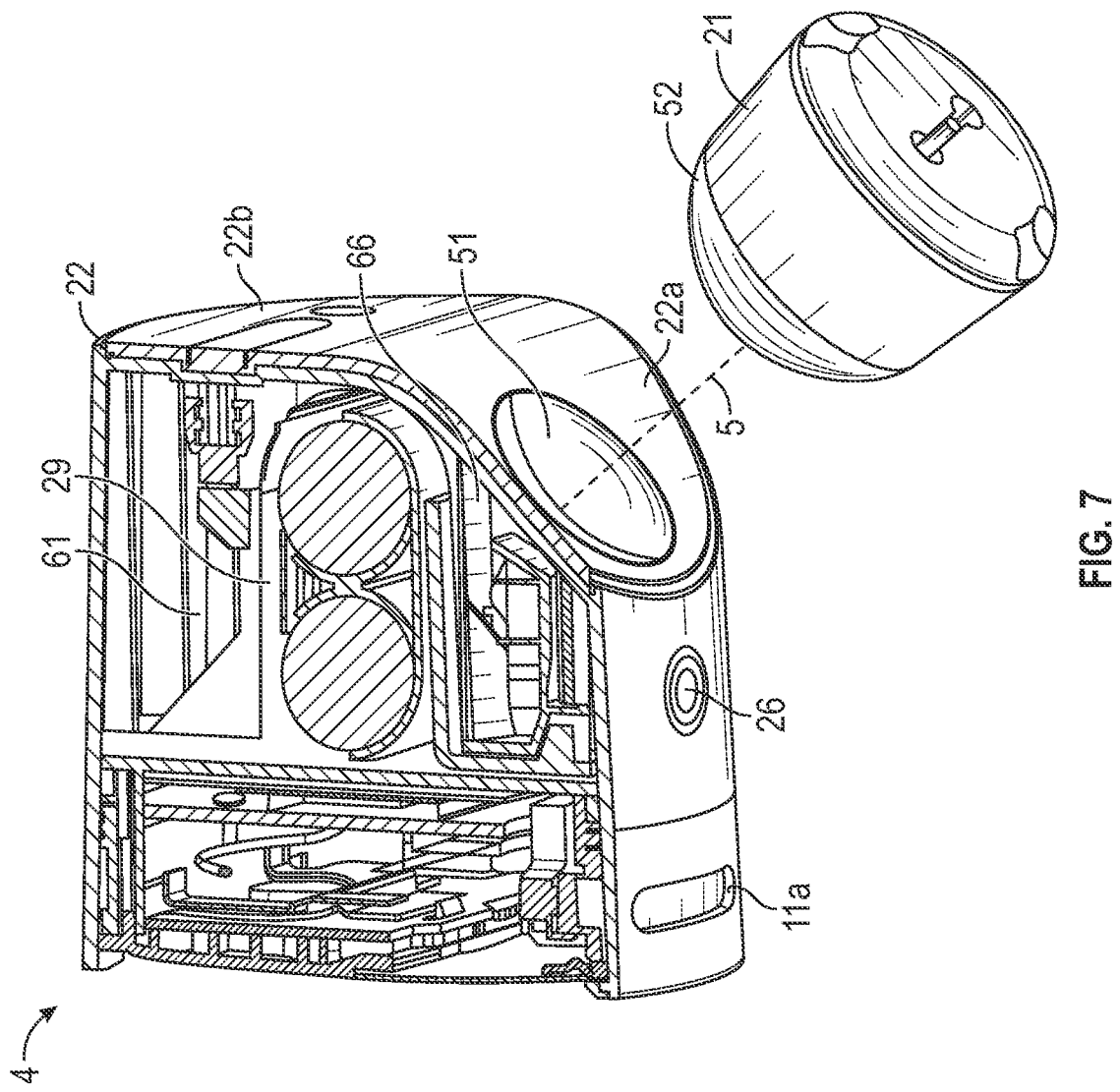
FIG. 7 is a section view of the FIG. 1 camera along the lines 7-7 in FIG. 2.

As can be seen more clearly in FIG. 7, the median axis 5 of the concave depression 51 is an axis that passes through the geometric center of the depression 51 shape. In some embodiments, the median axis 5 is arranged at an angle α relative to the optical axis 19 (and the central horizontal plane 6) of about 30 to 60 degrees (e.g. about 40 to 50 degrees (e.g., about 45 degrees)). Since the median axis 5 is perpendicular to a plane of the rear wall portion 22a in some embodiments, the rear wall portion 22a is also arranged at an angle of about 30 to 60 degrees (e.g. about 40 to 50 degrees (e.g., about 45 degrees)) relative to the optical axis 19 (and the central horizontal plane 6). However, the median axis 5 need not be perpendicular to the plane of the rear wall portion 22a, though in such cases the median axis 5 and/or the rear wall portion 22a can still be oriented at an angle of 30 to 60 degrees (e.g. about 40 to 50 degrees (e.g., about 45 degrees)) relative to the optical axis 19.

As described above, the optical device 10 housing has a first component 1 that includes the front face 15 and defines a distal part of the overall cylindrically shaped housing portion of the optical device 10, and a second component 2 that includes an overall cylindrically shaped housing. In some aspects, as described above, the first component 1 can include or house the majority (e.g., or substantially all of the optical components and other sensors/devices to operate the camera) and the second component 2 can house the battery and other components or circuitry required to provide power from the battery (or external power connector) to the imaging components in first component 1. That is, in some cases, the second component 2 can serve simply as a power transfer (and sometimes data transfer) device and most or all of the data processing and image capture/other optical components can be housed in the first component 1. This can be particularly useful in implementations where a user desires to change the type of first component 1 that is used (e.g., replacing a camera with a spotlight, or a first type of camera with a second type of camera). As discussed herein, such a configuration also permits removing the first component 1 having the data processing and image capture/other optical components (e.g., either to replace a first component 1 with another type of first component, or to replace a battery) without having to unmount the second component or to disturb its positioning, which can make the device easier for a user to use and maintain.

In some embodiments, the second component 2 can have a longitudinal length that is greater than the first component 1. For example, a ratio of longitudinal length of the second component to that of the first component can be at least about 2:1 to 4:1 (e.g., about 2.5:1 to 3:1 (e.g., about 2.7:1). The first component 1 can have a longitudinal length m of 10 mm to 30 mm (e.g. about 15 mm to 25 mm (e.g., about 20 mm)) and the second component 2 can have a longitudinal length n of 35 mm to 75 mm (e.g. about 45 mm to 65 mm (e.g., about 55 mm)).

The second component 2 can define multiple internal regions that can be open and exposed in some configurations or substantially covered or inaccessible, which can each be utilized for different purposes. For example, as shown in FIGS. 6-7, the second component 2 can include an electrical compartment 61 that can be substantially dedicated to house electronic devices, such as circuitry and wiring to convey power throughout the camera device. As discussed above, this can include contacts to connect with the battery; external connectors (e.g., a micro-USB) on a rear area of the camera to connect the camera to external devices, such as charging cables, solar panels, computers, tablets, etc.; an internal connector 25 that is used to electrically couple the second component 2 to the first component 1. In some cases, the electrical compartment 61 can also house one or more circuit boards configured to regulate and distribute power from the battery or the external connector to the internal connector to power the data processing and image capture/other optical components in the first component. In some cases, the one of more circuit boards can also be configured to control data being passed between the external and internal connectors for a variety of uses, such as providing updates or otherwise downloading software or firmware to the camera. As depicted, the electrical compartment 61 can be disposed in a region above the battery compartment 23. In some cases, the orientation at an upper region can be useful to limit or reduce the likelihood of liquid or moisture from accumulating in the electrical region and causing damage to electrical components.

The second component 2 can also define a mechanical mounting compartment 62 to contain or house mechanical mounting devices or features of the camera. As depicted, in some embodiments, the mechanical mounting compartment 62 can define a region in which a magnet 53 (described below) is affixed or otherwise positioned mount the camera. The mechanical mounting compartment 62 can be arranged at a lower region of the second component 2 on an opposite side of the battery 32 relative to the electrical compartment 61. In some cases, the orientation of the magnet 53 in this lower location can be beneficial to help limit adverse (or otherwise unwanted) effects of the battery within the camera. For example, the inventors have found that by orienting the more magnetically sensitive components, such as the imaging components and sensitive microchips/IC's, as well as the circuit boards in the electrical compartment 61 along an upper region of the camera (e.g., above the central plane 6) on top of the battery, a mounting magnet 53 can be placed within the camera, but at a distance that is sufficient to provide for adequate magnetic flux shielding. As a result in addition to some of the other benefits described herein regarding the orientation of various components, more versatile, and in some cases simpler, mounting systems can be implemented (even with compact structures) than with some other systems that use a magnet outside of the camera and rely on metal materials within the camera for mounting. As depicted, the second component 2 can also include or define a fixed position mounting device, such a threaded hole.

In some embodiments the electrical compartment 61, the battery compartment 23, and the mechanical mounting compartment 62 can be defined by a partition (e.g., a one-piece partition) 29 that substantially covers a front or distal end of the housing 22. In some cases, the partition 29 can be formed such that the electrical compartment 61 and the mounting compartment 62 are substantially on one side of the partition (albeit in some cases separated by the battery compartment 23 to define two different substantially separate compartments) and the battery compartment 23 is on the other, such that the electrical and mounting compartments 61, 62 are enclosed within the housing 22, and the battery compartment 23 is open to receive the battery 3. As depicted more specifically in FIG. 5, the contacts 13, 25 can be exposed on the surface of the partition 29 that is open and opposite the internal surface of the partition the faces the electrical compartment 61 (to which the contacts 25 themselves can be mounted). The partition 29 can also be used to position or secure the magnet 53. For example, a surface of the partition 29 (e.g., the same inner surface facing the electrical compartment 61), can provide a force to press the magnet 53 against an inner surface of the housing 22. In some cases, an intermediary component or material, such as flexible cushion-type material, or a resiliently deflecting tab can contact the magnet 53 and press it against the housing 22. This can decrease the need to use adhesives or additional fasteners, reducing costs and manufacturing resources.

As described above, the second component 2 also includes a proximal part of the cylindrically shaped housing portion as well as the lower rear wall portion 22a and an upper rear wall portion 22b, which can be perpendicular to the optical axis 19. The lower rear wall portion 22a extends from a rear-most surface of the housing (at the upper rear wall portion 22b) distally toward the front face 15, e.g., the lower rear wall portion 22a can extend at least 30% to 50% (e.g. about 35% to 45% (e.g., about 40%)) of a distance between the rear-most surface and the front face 15. As an example, the distance between the front face 15 and the upper rear wall portion 22b can be about 65 mm to 85 mm (e.g. about 70 mm to 80 mm (e.g., about 75 mm)), and the lower rear wall portion 22a can extend along 30 to 50% (e.g. about 35% to 45% (e.g., about 40%)) of that distance, e.g., the lower rear wall portion 22a can have a length of about 20 mm to 60 mm (e.g. about 30 mm to 50 mm (e.g., about 40 mm)) and be arranged at an angle of 30 to 60 degrees (e.g. about 40 to 50 degrees (e.g., about 45 degrees)) relative to the upper rear wall portion 22b.

Figure 8:
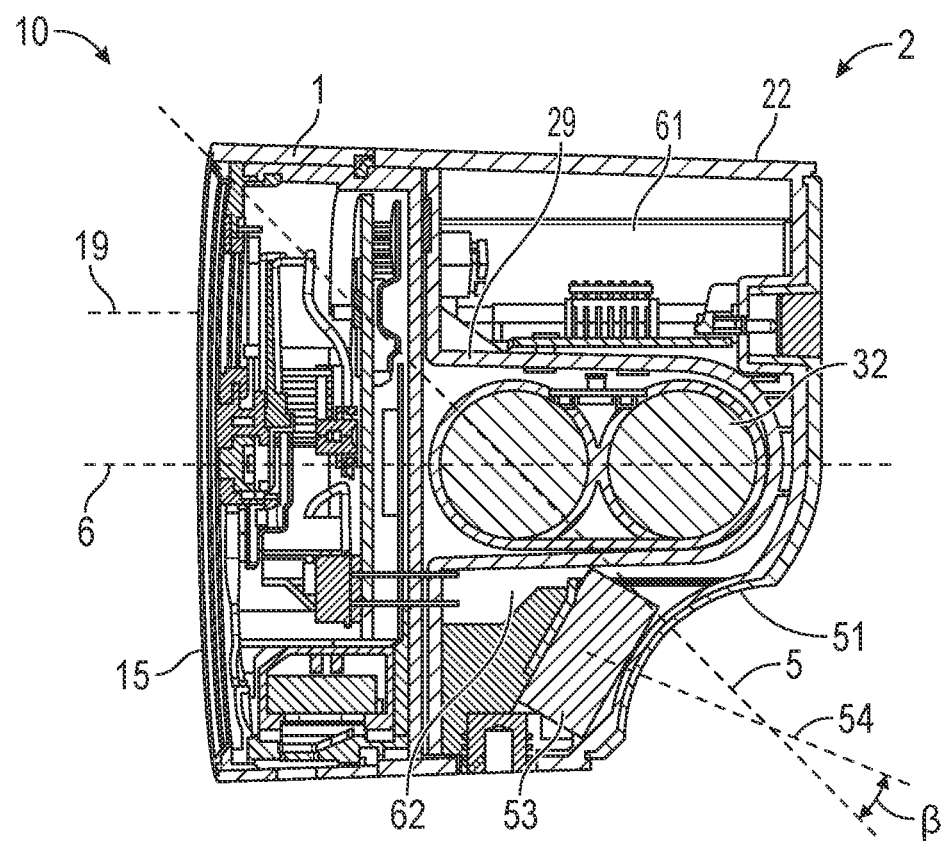
FIG. 8 is the section view of FIG. 6 with the camera pedestal removed.

In some embodiments, the housing portion 22 is engaged with the pedestal 21 by a magnetic force provided by a magnet 53 that is located within the housing portion 22. As can be seen in FIG. 6, the magnet 53 can be positioned adjacent an inner surface of the housing portion 22 and adjacent the concave depression 51. The pedestal 21 can include a suitably magnetically attractive component, such as steel or iron, to provide the desired engaging force between the pedestal 21 and the housing portion 22. As can be seen in FIG. 8, the magnet 52 can have a disc shape, e.g., a shape having two opposed, parallel, planar faces and a cylindrical wall extending between the faces, and one of the faces can be adjacent an inner side of the concave depression 51 and arranged at a non-perpendicular angle to the median axis 5. For example, as can be seen in FIG. 8, an axis 54 of the magnet 53 that passes through the center of, and is perpendicular to, the circular face nearest the concave depression 51 can be arranged at an angle β relative to the median axis 5 of about 10 degrees to 30 degrees (e.g. about 15 degrees to 25 degrees (e.g., about degrees)), i.e., the face can be arranged at a non-perpendicular angle to the median axis 5. In some embodiments, the magnet 53 can be positioned at or near a central region (e.g., such that the axis 5 passes through at least a portion of the magnet 53) of the concave depression 51. Moreover, the magnet 53 can be positioned below a location where the median axis 5 passes through the concave depression 51. In some embodiments, the magnet 53 can have an outer width (e.g., diameter) that is smaller than an outer width (e.g., circumference) than the concave depression 51. In some cases, this can be beneficial in order to attract the pedestal 21 toward a generally central region of the concave depression 51. This positioning can allow the housing portion 22 to be more compact because the battery 3 and battery compartment 23 can be positioned close to the concave depression 51 while still providing suitable magnetic force between the housing portion 22 and the pedestal 21. This arrangement for the magnet 53 is not required in all embodiments, however, and instead the magnet 53 can be positioned in other ways, such as in the pedestal 21 or elsewhere in the housing portion 22, or shaped in other ways, e.g., having a spherical surface that follows the contour of the convex portion 52 or of the concave depression 51.

In some embodiments, the outer housings of the housing portion 22 and the pedestal 21, including the parts that form the concave depression 51 and the convex portion 52, are formed of a molded plastic and arranged to provide a desired frictional force between the housing portion 22 and the pedestal 21. However, other arrangements are possible, including any suitable material (metal, composite, etc. to enhance or retard the magnetic force) as well as surface arrangements (ribbed, grooved, dimpled, etc. to adjust a frictional force between, or to provide a detent function between, the concave depression 51 and the convex portion 52). The pedestal 21 in some embodiments has a frustoconically shaped base below the convex portion 52 that is arranged to be secured to a support, such as a wall or post, by a fastener. However, the pedestal 21 can be shaped in other ways, and secured to a support in any one of multiple possible ways, such as brackets, adhesive, etc.

Operation of the optical component 11, battery 3 and other portions of the optical device can be controlled by the controller 16, which can include a programmed processor and/or other data processing device along with suitable software or other operating instructions, one or more memories (including non-transient storage media that can store software and/or other operating instructions), sensors, input/output interfaces (such as a user interface on the housing), communication modules, buses or other links, a display, switches, relays, triacs, or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

While example implementations described herein have generally been depicted in the context of wireless cameras, other embodiments are possible, and the beneficial systems and methods herein can be implemented in a variety of other devices that process and transmit data to connected devices, such as tablets, mobile devices, video gaming systems, communication devices, computer peripherals, audio equipment, etc. Additionally, while some example devices described herein are referred to as wireless, this is not intended to limit the claimed scope to require that no wires can be used to connect the devices to other things. For example, in some cases, some of the techniques and approaches described herein can be implemented in or with devices that receive power by a wired connection but transmit data wirelessly.

While systems and methods have been described with reference to various illustrative embodiments, such systems and methods are not limited to the embodiments described. Thus, it is evident that many alternatives, modifications, and variations of the embodiments described will be apparent to those skilled in the art. Accordingly, embodiments as set forth herein are intended to be illustrative, not limiting.

The invention claimed is:

1. A camera comprising:
a housing having a front face along which a viewing area is defined, the viewing area arranged to operate with an imager to capture image data and defining an optical axis through the viewing area, the housing having a rear wall portion with a concave depression arranged to receive a complementary convex portion of a pedestal arranged to permit omnidirectional rotation of the housing to position the housing relative to the pedestal by a magnetic force, the rear wall portion being arranged along a plane that is arranged at an angle of 30 degrees to 60 degrees relative to the optical axis.

2. The camera of claim 1, wherein a magnet is mounted in the housing to provide the magnetic force.

3. The camera of claim 2, wherein the magnet is disposed along an inner surface of the housing proximate the concave depression.

4. The camera of claim 1, further comprising a camera lens disposed proximate to the viewing area.

5. The camera of claim 1, wherein the optical axis is substantially perpendicular to an image capturing plane of the imager.

6. The camera of claim 1, wherein the pedestal has a frustoconically shaped base and the convex portion has a partial spherical shape.

7. The camera of claim 1, wherein the concave depression has a partial spherical shape.

8. The camera of claim 1, further comprising a magnet inside the housing that has a disc shape with a face of the disc shape adjacent a portion of the concave depression.

9. The camera of claim 1, wherein the housing defines a central horizontal plane that is parallel to the optical axis, and wherein the optical axis is arranged above the central horizontal plane and the concave depression of the rear wall portion is arranged below the central horizontal plane.

10. The camera of claim 9, wherein a central region of the concave depression of the rear wall portion is arranged approximately 10 mm to 30 mm below the central horizontal plane.

11. The camera of claim 1, wherein the rear wall portion extends from a rear-most surface of the housing distally toward the front face.

12. The camera of claim 1, wherein the rear wall extends at least 30% to 50% of a distance between the rear-most surface and the front face.

13. The camera of claim 1, wherein the convex portion of the pedestal comprises a surface formed of a polymer material.

14. The camera of claim 1, wherein the concave depression comprises a surface formed of a polymer material.

15. The camera of claim 1, wherein the front face is flat and perpendicular to the optical axis, and the housing includes a cylindrically shaped portion extending between the front face and the rear wall portion.

16. The camera of claim 15, wherein the rear wall portion is a first rear wall portion, and the housing includes a second rear wall portion positioned above the first rear wall portion and extending along a plane that is perpendicular to the optical axis.

17. The camera of claim 15, wherein the housing has a first component that includes the front face and a distal part of the cylindrically shaped portion, and a second component that includes a proximal part of the cylindrically shaped portion and the rear wall portion, and where the first and second components are selectively engagable and disengageable with respect to each other.

18. The camera of claim 17, wherein the first component includes the imager.

19. A camera comprising:
a housing having a front face along which a viewing area is defined, the viewing area arranged to operate with an imager to capture image data and defining an optical axis through the viewing area, the housing having a rear wall portion with a concave depression arranged to receive a complementary convex portion of a pedestal arranged to permit omnidirectional rotation of the housing to position the housing relative to the pedestal by a magnetic force, the concave depression having a median axis arranged at an angle to the optical axis of between 30 degrees and 60 degrees.

20. The camera of claim 19, wherein a magnet is mounted in the housing to provide the magnetic force.

21. The camera of claim 20, wherein the magnet is disposed along an inner surface of the housing proximate the concave depression.

22. The camera of claim 21, wherein the magnet has a disc shape with a face of the disc shape arranged at a non-perpendicular angle to the median axis.

23. The camera of claim 19, further comprising a camera lens disposed proximate to the viewing area.

24. The camera of claim 19, wherein the optical axis is substantially perpendicular to an image capturing plane of the imager.

25. The camera of claim 19, wherein the pedestal has a frustoconically shaped base and the convex portion has a partial spherical shape.

26. The camera of claim 19, wherein the concave depression has a partial spherical shape.

27. The camera of claim 19, wherein the housing defines a central horizontal plane that is parallel to the optical axis, and wherein the optical axis is arranged above the central horizontal plane and the concave depression of the rear wall portion is arranged below the central horizontal plane.

28. The camera of claim 27, wherein a central region of the concave depression of the rear wall portion is arranged approximately 10 mm to 30 mm below the central horizontal plane.

29. The camera of claim 19, wherein the rear wall portion extends from a rear-most surface of the housing distally toward the front face.

30. The camera of claim 19, wherein the rear wall extends at least 30% to 50% of a distance between the rear-most surface and the front face.

31. The camera of claim 19, wherein the front face is flat and perpendicular to the optical axis, and the housing includes a cylindrically shaped portion extending between the front face and the rear wall portion.

32. The camera of claim 31, wherein the rear wall portion is a first rear wall portion, and the housing includes a second rear wall portion positioned above the first rear wall portion and extending along a plane that is perpendicular to the optical axis.

33. The camera of claim 31, wherein the housing has a first component that includes the front face and a distal part of the cylindrically shaped portion, and a second component that includes a proximal part of the cylindrically shaped portion and the rear wall portion, and where the first and second components are selectively engagable and disengageable with respect to each other.

34. The camera of claim 33, wherein the first component includes the imager.

35. A camera comprising:
a housing having a front face along which a viewing area is defined, the viewing area arranged to operate with an imager to capture image data, the housing having a rear wall portion with a concave depression arranged to receive a complementary convex portion of a pedestal arranged to position the housing relative to the pedestal by a magnetic force, the concave depression having a median axis, and a magnet mounted in the housing to provide the magnetic force, the magnet having a planar face adjacent an inner side of the concave depression and arranged at a non-perpendicular angle to the median axis.

* * * * *